Feb. 14, 1933. W. E. A. TODD ET AL 1,897,345
VEHICLE BUMPER
Filed Nov. 12, 1931  5 Sheets-Sheet 3
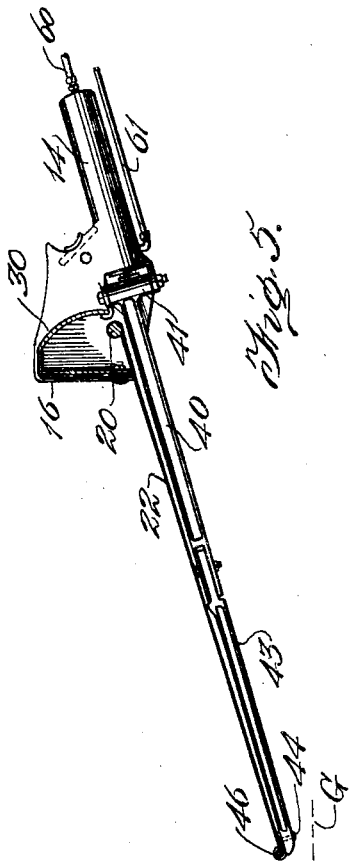
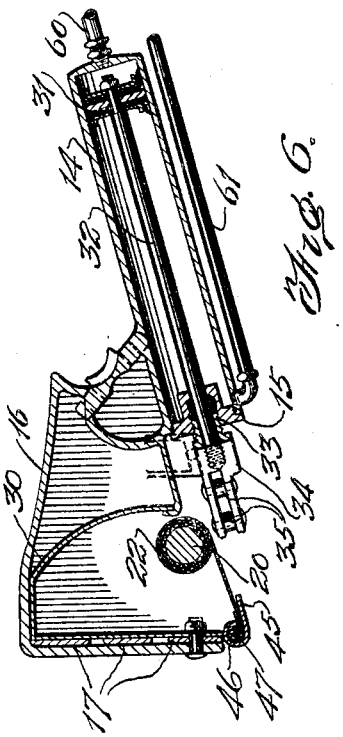
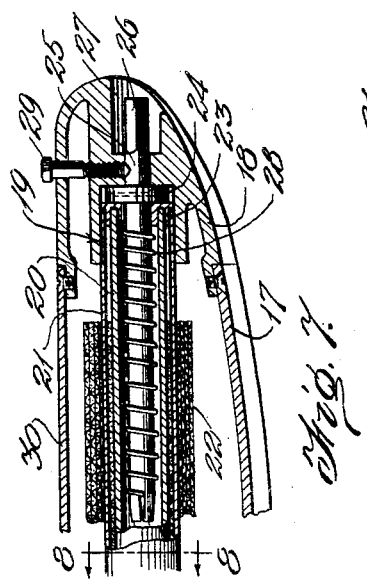
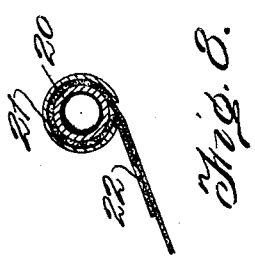
Inventors
W. E. ARTHUR TODD
FREDERICK R. L. STOTT
By
Attorney

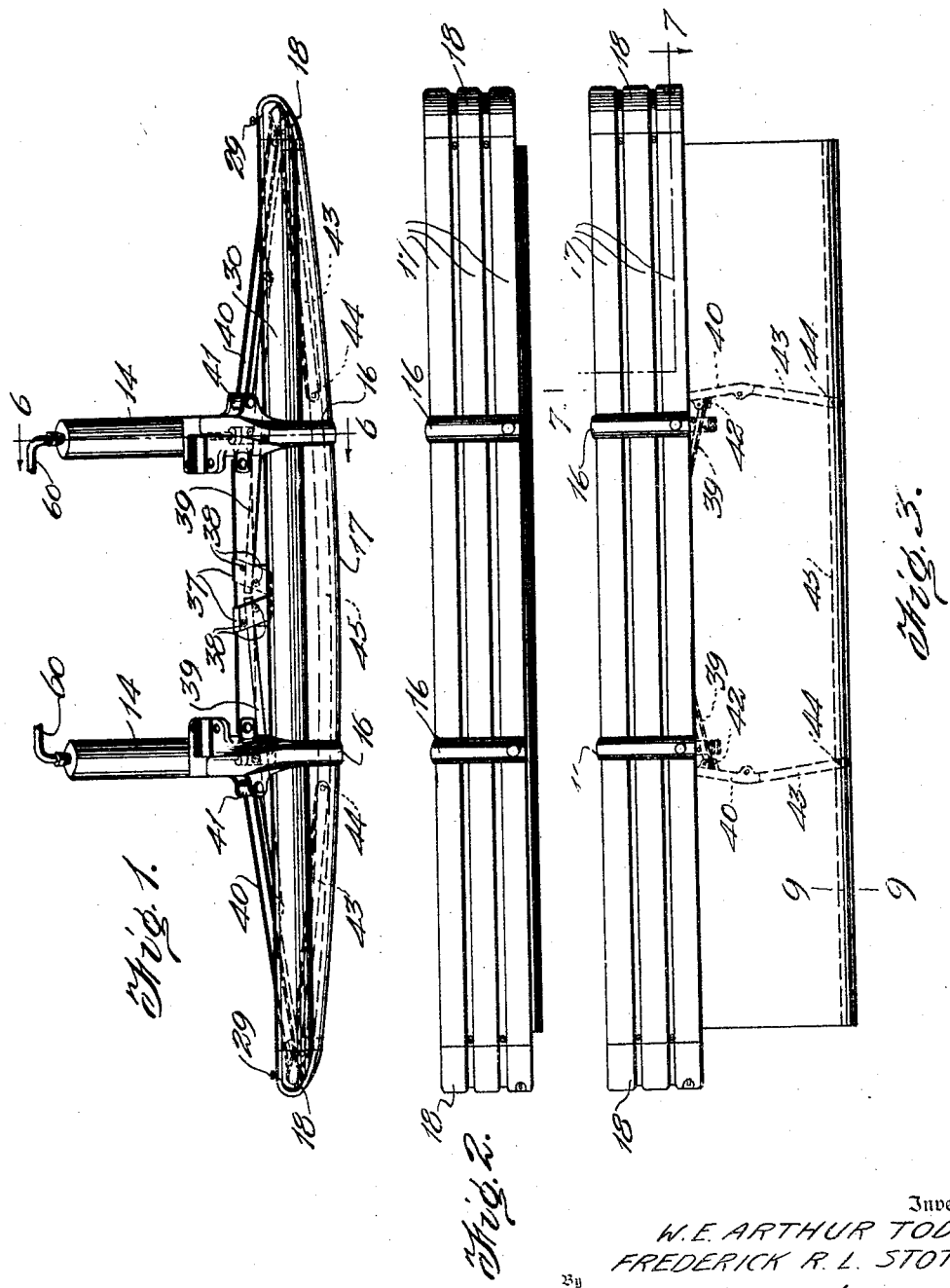

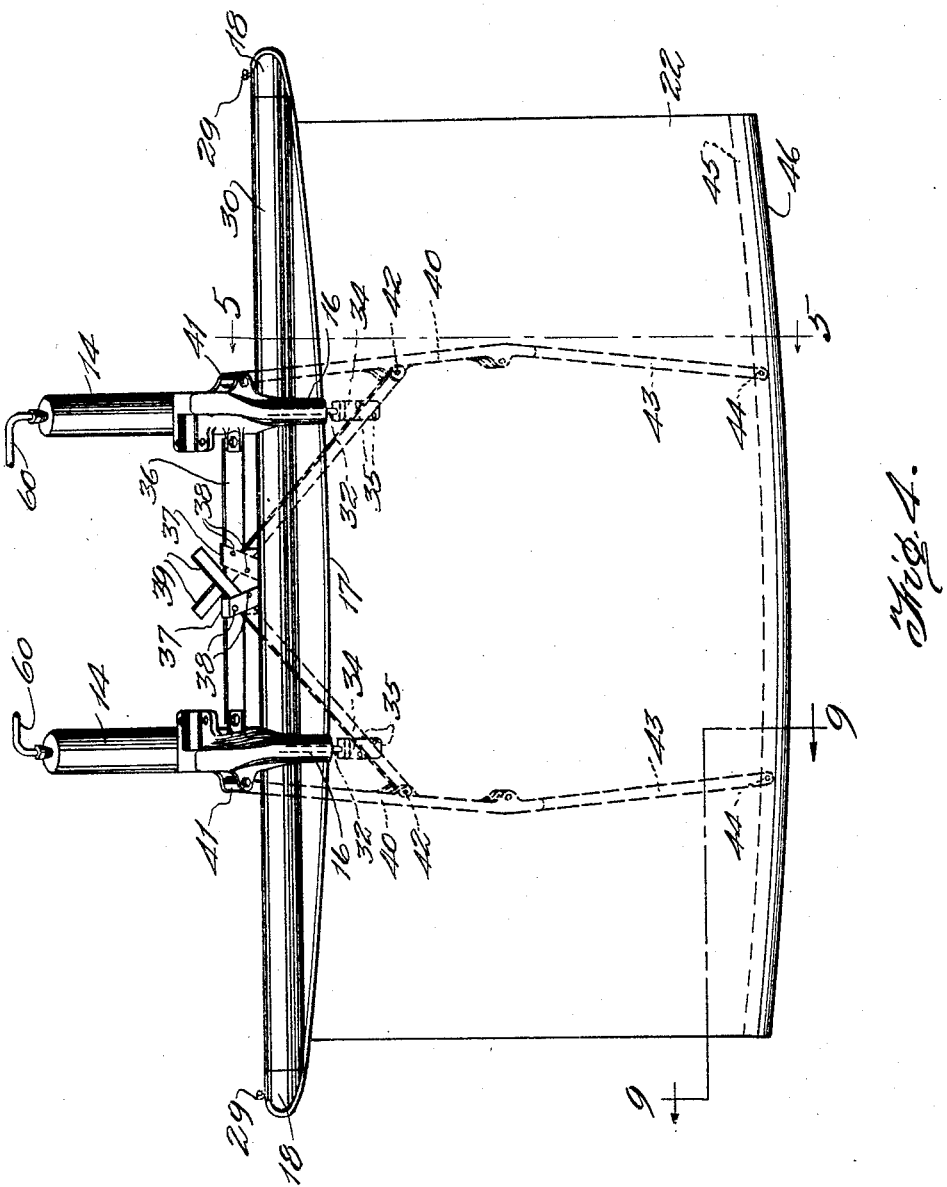

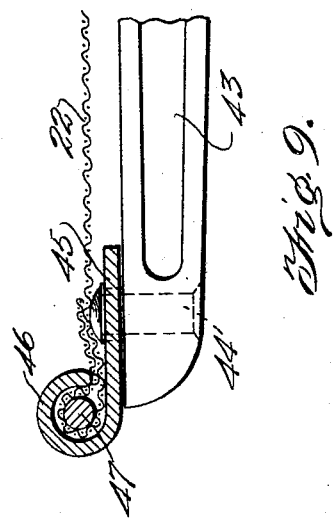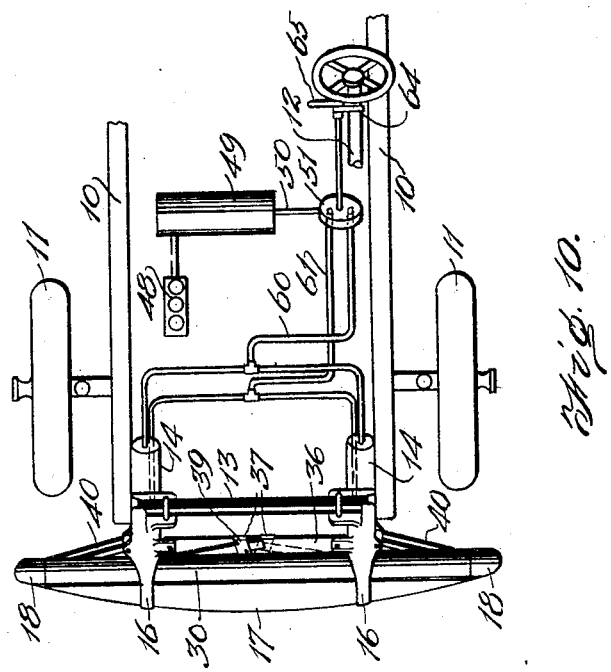

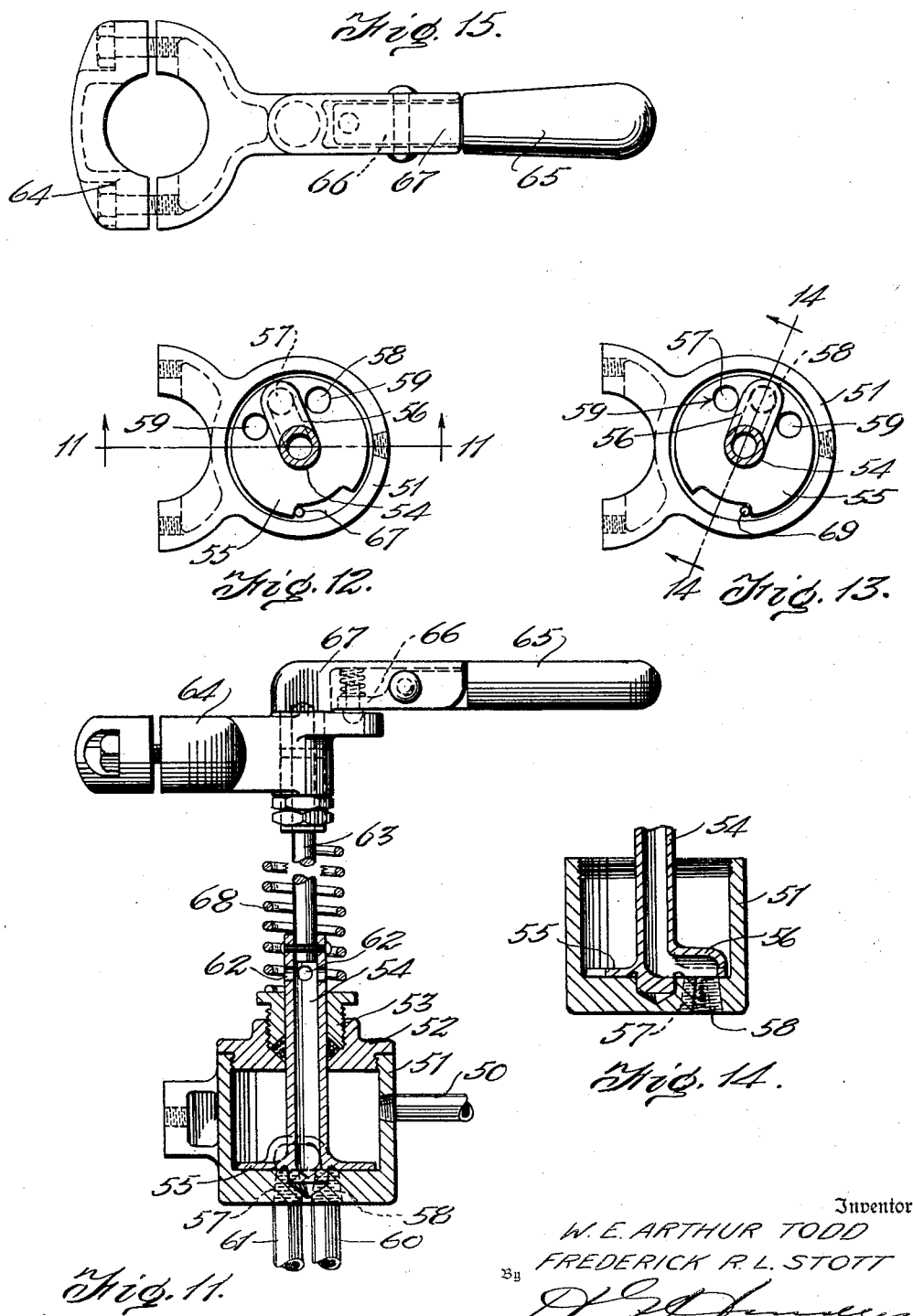

Patented Feb. 14, 1933

1,897,345

UNITED STATES PATENT OFFICE

WILLIAM E. ARTHUR TODD AND FREDERICK R. L. STOTT, OF HAMILTON, ONTARIO, CANADA

VEHICLE BUMPER

Application filed November 12, 1931. Serial No. 574,543.

This invention relates to bumpers such as are used on motor vehicles and the like. More especially the invention relates to a combined bumper and apron forming an emergency bumper.

One important object of the invention is to provide a novel general construction of bumper and apron for this purpose.

A second important object of the invention is to provide an improved means for operating an apron so that it may be protracted from and retracted to a motor vehicle.

A third important object is to provide a novel pneumatic means for operating a protractable bumper adapted to be carried by an automobile or the like.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1 is a plan view of the forward parts of the invention separate from the vehicle.

Figure 2 is a front elevation of the parts shown in Figure 1 with the apron retracted or housed.

Figure 3 is a view similar to Figure 2 but with the apron protracted.

Figure 4 is a plan view of the parts as shown in Figure 3.

Figure 5 is a section on the line 5—5 of Figure 4.

Figure 6 is an enlarged detail section on the line 6—6 of Figure 1.

Figure 7 is an enlarged detail section on the line 7—7 of Figure 3.

Figure 8 is a detail section on the line 8—8 of Figure 7.

Figure 9 is an enlarged detail section on the line 9—9 of Figure 3.

Figure 10 is a plan view, somewhat diagrammatic, of the invention in position on an automobile.

Figure 11 is a side elevation, partly in section, on the line 11—11 of Figure 12, of the valve means for controlling the invention.

Figure 12 is a plan view, partly in section of the valve casing and valve with the cap removed, the valve being shown in position for protracting the apron.

Figure 13 is a view similar to Figure 12 but with the valve in apron retracting position.

Figure 14 is a detail section on the line 14—14 of Figure 13.

Figure 15 is a plan view of the valve.

In the embodiment of the invention as here shown there is disclosed in Figure 10 the forward portion of an automobile chassis having the usual side frame members 10 and front wheels 11. The steering colum 12 is shown and also the front frame tie bar 13. Secured to the front bar 13 close against the inner sides of the members 10 is a pair of brackets. Each of these brackets includes a tubular rear portion forming a cylinder 14 closed at its rear end and provided at its front end with a removable head 15. Each bracket also has a forward hook like portion 16 and to the inner faces of these forward portions are secured the usual spring bumper strips 17. At each end of the bumper these strips are connected to a bearing member 18, these bearing members being aligned and having in their confronting ends bearing recesses 19. Supported in the recesses 19 are the ends of a roller having an inner member 20 which is tubular at least at its ends. A split tube 21 surrounds the tube 20 and between these tubes is one end portion of an apron 22 which is wrapped around the inner tube and protrudes from the slit as best seen in Figure 8. These tubes are held in proper relation by heads 23 at their ends and are supported for free rotation by the ball bearings 24. Through each bearing 24 extends a pin 25 which is revolubly mounted in the bearing member and has a square head 26 located in a recess 27 in the outer end of the respective bearing member. Surrounding the inner end of the pin within the tube 19 is a coiled torsion spring 28 which has one end fixed to the pin and its other end fixed to the head, the construction being similar to the spring arrangement of an ordinary shade roller, the spring constantly urging the roller to rotate in proper direction to wind the apron thereon. A set screw 29 engages the pin to hold it against rotation and the tension of the spring may be adjusted by loosening this set screw and revolving the pin by a suitable socket wrench, the set screw being, of course, tightened after the adjustment is made. A housing 30 covers this roller to protect the parts, and is supported by the brackets 16.

In each of the cylinders 14 is a piston 31 provided with suitable packing. Each piston carries a piston rod 32 projecting through a stuffing box 33 in the head 15. On its projecting end the rod carries a fork 34 and between the arms of this fork is mounted a pair of guide rollers 35. The brackets are connected by a brace member 36 whereon is mounted a pair of guide clips 37 each having a pair of diagonally disposed guide rollers 38. Operating bars 39 are so disposed that each extends between a respective pair of the rollers 38 and a corresponding pair of the rollers 35. Thus the bars are slidably pivoted between the rollers 38 and are slidably connected to the piston rods. Struts or arms 40 are pivoted to the brackets at 41 to swing between laterally projecting and forwardly projecting positions as shown respectively in Figures 1 and 4. The free ends of the bars 39 are pivoted to the arms 40 at 42. Front arms 43 are pivotally connected to the free ends of the arms 40 and the free or forward ends of arms 43 are pivoted at 44 to a front edge strip 45 for the apron 22. This strip 45 has its front part rolled to form a slotted tube 46 wherein is an apron securing rod 47 around which the front edge portion of the apron 22 is engaged as shown in Figure 9.

In Figure 10 there is indicated a pump 48 for delivering compressed air to a tank 49. This pump is driven in any suitable manner not necessary here to be shown. A pipe 50 leads from the tank 49 to the body of a valve casing of cylindrical form. This valve casing has a head 52 provided with a stuffing box 53 wherethrough extends the tubular stem 54 of a circular valve 55 resting on the bottom of the body 51. The lower part of the valve stem has a radial extension 56 which, by oscillation of the valve, may be caused to selectively register with ports 57 and 58 formed in the bottom of the body 51. Also the valve plate has a pair of ports 59, one at each side of the extension 56 and so spaced that when the extension 56 registers with port 57, port 58 will be open to the interior of the valve casing and when extension 56 registers with port 58, port 57 will be open to the interior of the valve casing. A pipe 60 leads from port 58 and is branched and connected to the rear or back ends of cylinders 14. A similar pipe 61 leads from port 57 to the front ends of said cylinders. Lateral ports 62 in the upper end of the valve stem permit escape of air from said stem. An operating stem 63 is secured to the upper end of stem 54 and has its upper end journalled in a bracket 64 mounted on the steering post 12. A handle 65 having a spring urged latch 66 is pivoted in an arm 67 on the upper end of the stem 63 for operating the valve. A torsion spring 68, one end fastened to the stem 54 and the other end fastened to the valve body 51, constantly urges the valve to the position for protracting the apron, but the latch 66 prevents the valve from springing to that position until disengaged from its keeper by the downward movement of the handle 65. Stop means 69 serve to properly limit the movement of the valve in each direction.

In operation the apron is normally rolled up or housed and the pistons are at the upper or rear ends of the cylinders. Should the driver of the car see a person about to be struck he releases the valve handle (a tap by the hand is sufficient) whereupon the valve springs to the position admitting compressed air to the rear ends of the cylinders which moves the pistons forwardly and, by action of the operating rods 39 and arms 40 and 43 causes the apron to unroll to the position shown in Figures 3, 4, and 5, the lower edge coming close to the ground G (Fig. 5). If a person is struck with the apron in this position he will be picked up on the apron and the vehicle will not run over him. The apron is restored to its normal position by shifting the valve to allow air to flow into the lower ends of the cylinders and exhaust from the upper ends. This will retract the front edge of the apron and the roller spring will act to reroll it.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. A bumper for vehicles including an apron, a spring roller whereon said apron is normally wound, an edge strip attached to the free edge of the apron, a pair of pneumatic cylinders mounted rearwardly of the roller, pistons in said cylinders, piston rods carried by said pistons and projecting from said cylinders, operating rods arranged to pivot about fixed points and slidable relative to said fixed points, connections between said piston rods and operating arms, pairs of arms, the arms of each pair each having one end connected to the coacting end of the other arm, the remaining ends of each pair of arms being respectively pivoted to a fixed point and to the edge strip, and a pivotal connection between each operating rod and an arm of a respective pair.

2. A bumper for vehicles including an apron, a spring roller whereon said apron is normally wound, an edge strip attached to the free edge of the apron, a pair of pneumatic cylinders mounted rearwardly of the roller, pistons in said cylinders, piston rods carried by said pistons and projecting from said cylinders, a pair of fixed brackets each having a pair of spaced rollers, a pair of yokes each carried by a respective piston rod and provided with a pair of spaced rollers, operating rods each passing between the rollers of a respective bracket and between the rollers of a respective yoke, arms each having one end pivoted at a fixed point and having pivotal connection intermediate its ends with an end of a respective operating rod, and other arms each having one end pivoted to the free end of a respective first mentioned arm and each having its other end pivoted to said edge strip.

3. A bumper for vehicles including an apron, a spring roller whereon said apron is normally wound, an edge strip attached to the free edge of the apron, a pair of pneumatic cylinders mounted rearwardly of the roller, pistons in said cylinders, piston rods carried by said pistons and projecting from said cylinders, operating rods arranged to pivot about fixed points and slidable relative to said fixed points, connections between said piston rods and operating arms, pairs of arms, the arms of each pair each having one end connected to the coacting end of the other arm, the remaining ends of each pair of arms being respectively pivoted to a fixed point and to the edge strip, a pivotal connection between each operating rod and an arm of a respective pair, and valve means controlling the projection of said piston rods.

4. A bumper for vehicles including an apron, a spring roller whereon said apron is normally wound, an edge strip attached to the free edge of the apron, a pair of pneumatic cylinders mounted rearwardly of the roller, pistons in said cylinders, piston rods carried by said pistons and projecting from said cylinders, a pair of fixed brackets each having a pair of spaced rollers, a pair of yokes each carried by a respective piston rod and provided with a pair of spaced rollers, operating rods each passing between the rollers of a respective bracket and between the rollers of a respective yoke, arms each having one end pivoted at a fixed point and having pivotal connection intermediate its ends with an end of a respective operating rod, other arms each having one end pivoted to the free end of a respective first mentioned arm and each having its other end pivoted to said edge strip, and valve means controlling the projection of said piston rods.

5. A bumper for vehicles including an apron, a spring roller whereon said apron is normally wound, an edge strip attached to the free edge of the apron, a pair of pneumatic cylinders mounted rearwardly of the roller, pistons in said cylinders, piston rods carried by said pistons and projecting from said cylinders, operating rods arranged to pivot about fixed points and slidable relative to said fixed points, connections between said piston rods and operating arms, pairs of arms, the arms of each pair each having one end connected to the coacting end of the other arm, the remaining ends of each pair of arms being respectively pivoted to a fixed point and to the edge strip, a pivotal connection between each operating rod and an arm of a respective pair, a valve casing having fluid pressure supply means and having a pair of ports connected respectively to the front and rear ends of said cylinders, a valve in said casing having an exhaust passage and controlling the admission of fluid to said ports, and means to move said valve to selectively open a respective port to the admission of fluid and the other port to said passage.

6. A bumper for vehicles including an apron, a spring roller whereon said apron is normally wound, an edge strip attached to the free edge of the apron, a pair of pneumatic cylinders mounted rearwardly of the roller, pistons in said cylinders, piston rods carried by said pistons and projecting from said cylinders, a pair of fixed brackets each having a pair of spaced rollers, a pair of yokes each carried by a respective piston rod and provided with a pair of spaced rollers, operating rods each passing between the rollers of a respective bracket and between the rollers of a respective yoke, arms each having one end pivoted at a fixed point and having pivotal connection intermediate its ends with an end of a respective operating rod, other arms each having one end pivoted to the free end of a respective first mentioned arm and each having its other end pivoted to said edge strip, a valve casing having fluid pressure supply means and having a pair of ports connected respectively to the front and rear ends of said cylinders, a valve in said casing having an exhaust passage and controlling the admission of fluid to said ports, and means to move said valve to selectively open a respective port to the admission of fluid and the other port to said passage.

7. A bumper for vehicles including an apron, a spring roller whereon said apron is normally wound, an edge strip attached to the free edge of the apron, a pair of pneumatic cylinders mounted rearwardly of the roller, pistons in said cylinders, piston rods carried by said pistons and projecting from said cylinders, a linkage connecting said piston rods and said edge strip, brackets each carried by a respective cylinder and having an end of the roller journaled therein, and a hood extending between the brackets and covering said roller.

8. A bumper for vehicles including an apron, a spring roller whereon said apron is normally wound, an edge strip attached to the free edges of the apron, a pair of pneumatic cylinders mounted rearwardly of the roller, pistons in said cylinders, piston rods carried by said pistons and projecting from said cylinders, operating rods arranged to pivot about fixed points and slidable relative to said fixed points, connections between said piston rods and operating arms, pairs of arms, the arms of each pair each having one end connecting to the coacting end of the other arm, the remaining ends of each pair of arms being respectively pivoted to a fixed point and to the edge strip, a pivotal connection between each operating rod and an arm of a respective pair, brackets each carried by a respective cylinder and having an end of the roller journalled therein, and a hood extending between the brackets and covering said roller.

9. A bumper for vehicles including an apron, a spring roller whereon said apron is normally wound, an edge strip attached to the free edge of the apron, a pair of pneumatic cylinders mounted rearwardly of the roller, pistons in said cylinders, piston rods carried by said pistons and projecting from said cylinders, a pair of fixed brackets each having a pair of spaced rollers, a pair of yokes each carried by a respective piston rod and provided with a pair of spaced rollers, operating rods each passing between the rollers of a respective bracket and between the rollers of a respective yoke, arms each having one end pivoted at a fixed point and having pivotal connection intermediate its ends with an end of a respective operating rod, other arms each having one end pivoted to the free end of a respective first mentioned arm and each having its other end pivoted to said edge strip, brackets each carried by a respective cylinder and having an end of the roller journalled therein, and a hood extending between the brackets and covering said roller.

10. A bumper for vehicles including an apron, a spring roller whereon said apron is normally wound, an edge strip attached to the free edge of the apron, a pair of pneumatic cylinders mounted rearwardly of the roller, pistons in said cylinders, piston rods carried by said pistons and projecting from said cylinders, a linkage connecting said piston rods and said edge strip, valve means controlling the protraction of said piston rods, brackets each carried by a respective cylinder and having an end of the roller journalled therein, and a hood extending between the brackets and covering said roller.

11. A bumper for vehicles including an apron, a spring roller whereon said apron is normally wound, an edge strip attached to the free edge of the apron, a pair of pneumatic cylinders mounted rearwardly of the roller, pistons in said cylinders, piston rods carried by said pistons and projecting from said cylinders, operating rods arranged to pivot about fixed points and slidable relative to said fixed points, connections between said piston rods and operating arms, pairs of arms, the arms of each pair each having one end connected to the coacting end of the other arm, the remaining ends of each pair of arms being respectively pivoted to a fixed point and to the edge strip, a pivotal connection between each operating rod and an arm of a respective pair, valve means controlling the protraction of said piston rods, brackets each carried by a respective cylinder and having an end of the roller journalled therein, and a hood extending between the brackets and covering said roller.

12. A bumper for vehicles including an apron, a spring roller whereon said apron is normally wound, an edge strip attached to the free edge of the apron, a pair of pneumatic cylinders mounted rearwardly of the roller, pistons in said cylinders, piston rods carried by said pistons and projecting from said cylinders, a pair of fixed brackets each having a pair of spaced rollers, a pair of yokes each carried by a respective piston rod and provided with a pair of spaced rollers, operating rods each passing between the rollers of a respective bracket and between the rollers of a respective yoke, arms each having one end pivoted at a fixed point and having pivotal connection intermediate its ends with an end of a respective operating rod, other arms each having one end pivoted to the free end of a respective first mentioned arm and each having its other end pivoted to said edge strip, valve means controlling the protraction of said piston rods, brackets each carried by a respective cylinder and having an end of the roller journalled therein, and a hood extending between the brackets and covering said roller.

In testimony whereof they have affixed their signatures.

W. E. ARTHUR TODD.
FREDERICK R. L. STOTT.